DAMPING TECHNIQUE FOR A MEMORY DRIVE SCHEME

Filed April 20, 1970

INVENTOR
ALAN WU
BY Leo Stanger
ATTORNEY

United States Patent Office 3,706,083
Patented Dec. 12, 1972

3,706,083

DAMPING TECHNIQUE FOR A MEMORY DRIVE SCHEME

Alan C. Wu, Watertown, Mass., assignor to Honeywell Inc., Minneapolis, Minn.

Filed Apr. 20, 1970, Ser. No. 29,974
Int. Cl. G11b 5/00
U.S. Cl. 340—174 TB 8 Claims

ABSTRACT OF THE DISCLOSURE

A memory drive circuit has a switch for applying voltage from a voltage source to a number of conductive lines and another switch for selecting one of these conductive lines. A resistive element and a diode are serially connected between the conductive lines and a junction having a reference voltage which biases the diode for conduction.

BACKGROUND

This invention relates to a drive circuit for a computer memory, and more particularly to a drive circuit which is magnetically coupled with the storage elements within the computer memory.

With the development of the core memory systems, drive circuits have been devised for reading and writing information within the core storage locations. Each of the drive schemes employs pulse drivers connected to conductive lines, which are associated with the magnetic cores.

In the first development of core memory systems, drive circuits using vacuum tubes were constructed. As transistor technology matured, vacuum tube drivers were eventually replaced by hi-speed, hi-current, hi-voltage transistors. Such evolution is manifest in the use of the traditional discrete transistor-transformer drive circuitry.

Computer memories, themselves, have also undergone development. Plated wire memories, as well as core memories, are now available. A plated wire memory element is composed of a film of magnetic material that is plated on a conductive bit line. Parallel ones of such plated bit lines, extending traverse to conductive drive lines, form the plated wire memory. Bit positions within the magnetic plating on the lines are determined at the intersection of drive lines with the plated wires. Drive systems are also used in association with plated wire memory elements to activate the drive lines.

The advantages of a plated wire memory are now apparent. The most significant advantage is the non-destructive read-out of stored data. Also, a plated wire memory is characterized by a higher switching speed than that of the core memory. Reading and writing, then, of information in a plated wire memory is done at much higher speeds.

Noise, however, still results from the read-write operation. This noise results from the combination of the stray inductances in the drive system and the capacitance between the drive lines and memory elements. The problem is common to both the plated wire and core memories. However, noise is a greater problem in a plated wire memory, since its read-out signals are smaller than those of the core memory.

It is thus an object of the present invention to provide a drive circuit which minimizes noise in a computer memory system.

It is a further object of the present invention to provide a damping network in a drive system for the elimination of noise in a plated wire memory.

Other objects of the invention will be evident from the description hereinafter presented.

SUMMARY OF THE INVENTION

The present invention provides a memory drive circuit in which switching elements are connected to a number of conductive drive lines, which are associated with an array of storage elements in a memory plane. The switching elements are connected to a voltage source for applying a voltage or current pulse to the conductive lines. The transmission of current through the selected drive line or lines generates a magnetic flux which allows for reading and writing within the associated memory elements. The switching elements may, for example, comprise transistors coupled to an AC transformer.

An electronic network is connected to a junction between the conductive lines and their respective switching elements. The network comprises an impedance element which serves to dampen the noise produced during the read-write operation. According to a feature of the invention the impedance element is connected to a second junction having a reference voltage. Preferably the reference voltage is such as to limit the current through the network during the read-write operation to a value no greater than the current value in the selected drive line. A diode is connected in series with the impedance element to prevent a conduction of current through the network when the drive circuit is not selected in a read or write mode.

These and other features which are considered to be characteristic of this invention are set forth with particularity in the appended claims. The invention itself, however, as well as additional objects and advantages thereof, will thus be understood from the following description when considered in conjunction with the accompanying drawings.

DESCRIPTION OF THE PREFERRED EMBODIMENT

Figures 1, 2, 3, 4:
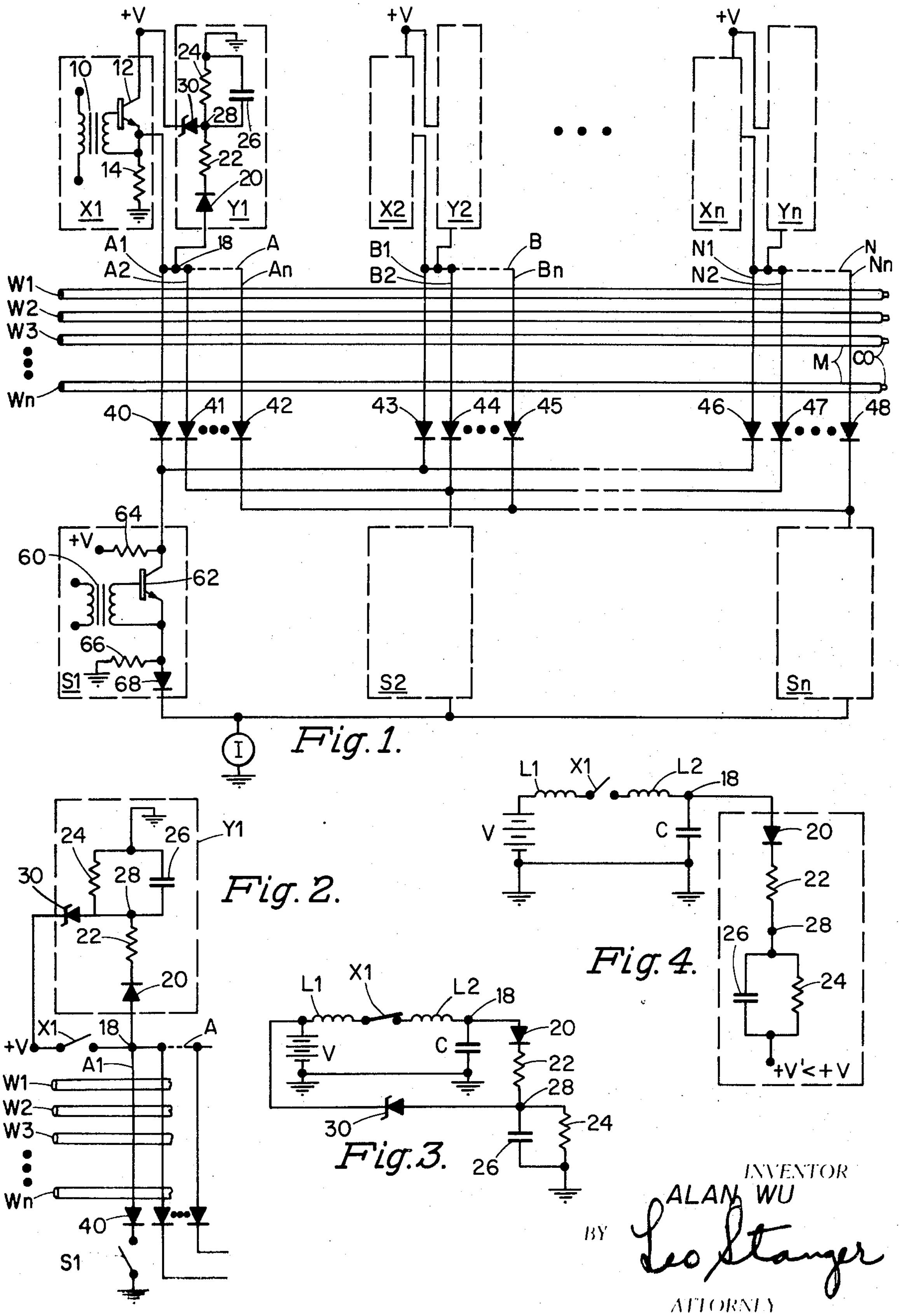
FIG. 1 is a block and schematic circuit diagram of a memory and drive system embodied as a preferred form of the present invention.
FIG. 2 is a simplified circuit, including the conductive lines of one bus line, of FIG. 1.
FIG. 3 is equivalent to the circuit of FIG. 2 with the inclusion of stray inductances and the capacitance between the conductive lines and their respective memory elements.
FIG. 4 is an alternative embodiment of the circuit shown in FIG. 3.

In FIG. 1 respective drive circuits X1, X2, . . . X*n*, when selectively actuated, each form a path of current flow to a group of bus lines A, B, . . . N and then to drive lines A1, A2, . . . A*n*, B1, B2, . . . B*n*, N1, N2, . . . N*n*. A switching circuit S1, when selectively actuated, provides the path of current flow from the lines, A1, B1, . . . N1 to a current source I. Similarly, switching circuits S2, . . . S*n*, when selectively actuated, provide paths of current flow from the lines A2, B2, . . . N2, . . . A*n*, B*n*, N*n* . . . to the same current source I. The drive circuits X1 to X*n*, drive lines A1 to N*n*, and switching circuits S1 to S*n* form a basic memory drive system.

In this system, the drive lines are each parallel to each other and extended transverse to a group of wire memory elements W1, W2 . . . W*n*. Each memory element is composed of a cylindrical length of magnetic material M surrounding a conductor CO.

Closing of any one drive circuit X1 to X*n* and any one switching circuit S1 to S*n* allows current to flow through a single selected drive line A1 to N*n*. When this current, for example in the form of a pulse, coincides with a current through one conductor CO in one of the elements W1 to W*n* the combined currents change the permanent magnetic condition of the material M at the intersection of the selected element and the selected drive line. The currents thus effectively "write" on the magnetic material at the intersection. Currents flowing through line A1 to N*n* change the condition of the magnetic material only temporarily, but enough to create a voltage pulse through the transverse conductors CO. This pulse is indicative of the condition at the intersections and effectively "reads" out the memory.

Conventionally the currents through the drive lines are obtained by first actuating the selected drive circuit X1, . . . X*n*, and then the selected switching circuit S1 . . . S*n*. Noise often interferes with the resulting read or write operation.

According to the invention damping circuits Y1 to Y*n* connect respectively to bus lines A, B, . . . N and form a part of the drive system.

For each bus line to driver relationship, the interconnections between the driver, damping network, bus line, respective drive lines, and the respective switching circuits are identical. Furthermore, the like components of the drive system are identical. A description, then, of one driver X1 in relation to the switching circuits S1, S2, . . . S*n* should be sufficient for an understanding of the operation of the entire drive system.

The driver portion X1 of the circuit of FIG. 1 energizes the lines A1 to A*n* with an NPN transistor 12 which is coupled to an AC input from a drive circuit selector by a transformer 10. The transformer 10 actuates the input circuit, e.g. the base and emitter, of the transistor 12. The collector of the transistor 12 is biased by +V, a collector source. The emitter of transistor 12 is connected in series with a resistor 14 to a ground potential. The transistor 12 is normally biased off. A pulse appearing at the transformer 10 renders it conductive and connects the source +V to the lines A1 to A*n*.

Bus line A is connected to the emitter of the transistor 12. Drive lines A1, A2, . . . A*n* which are effectively connected in parallel with each other, are connected to bus line A and extend transverse and orthogonal to the plated wire memory elements W1, W2, . . . W*n*. Diodes 40, 41 and 42 are connected in series between their respective drive lines A1, A2 and A*n* and switching circuits S1, S2 and S*n*.

Switching circuit S1 comprises an NPN transistor 62 coupled to an AC input current by means of transformer 60, which is connected to the base and emitter of the transistor 62. A resistor 64 is connected in series with the collector of transistor 62 and a +V collector source. A resistor 66 is connected in series with the emitter of transistor 62 and a ground potential. A diode 68 is in series with the emitter of transistor 62 and constant current source I. Transistor 62 is normally biased off. When a pulse appears at transformer 60 it renders transistor 62 conductive to extend the conductive path from source +V through transistor 12 through drive line A1 to current source I.

Current source I preferably includes a transistor, not shown, which assures a constant current flow through the drive lines when the current source is activated by a voltage pulse. Current source I is connected in series with each of the switches S1, S2, . . . S*n* and ground potential and always maintains a high impedance.

Each of the switching circuits S1, S2 and S*n* is connected to a corresponding drive line within each set of drive lines associated with a different bus line. Thus, when transistor 12 within driver X1 is turned on by an input pulse, activation of switching circuit S1 selects drive line A1 for transferring the read or write pulse. Diodes 43 and 46, in series with switch S1 and their corresponding drive lines B1 and N1, are back biased to prevent the pulse from being transferred through these drive lines.

In FIG. 2, drive lines A1, A2, . . . A*n* are shown in relationship to the plated wire memory elements W1, W2, . . . W*n* and the active system components associated with it. The driver X1 and the switching circuit S1 are represented by simple switches. As in FIG. 1, damping network Y1 is connected to bus line A at junction 18. In the damping network, a diode 20 in series with a resistor 22 passes currents to a junction 28. There, a Zener diode 30 connected to the source +V establishes a constant potential across a resistor 24 and AC bypass capacitor 26 connected in parallel.

FIG. 3 shows an equivalent circuit of the arrangement of elements shown in FIG. 2 after driver X1 is turned on and prior to selection by a switch S1 to S*n*. The inductances L1 and L2 represent, respectively, the stray inductances between the driver X1 and its voltage source +V and the driver X1 and drive lines A1 to A*n*. Capacitor C represents the total capacitance between the drive lines A1, A2, . . . A*n* and memory elements W1, W2, . . . W*n*. With the activation of X1 and the selection switches still in an open position, the input pulse produces ringing current through the lines A1, A2, . . . A*n* and their corresponding memory elements. The ringing current produces the undesirable noise in the memory system.

The damping resistor 22, within network Y1, provides for the elimination of noise within the driving circuit. To critically damp the circuit the value of the resistance is chosen to be equal to the quantity $$\frac{1}{2}\sqrt{\frac{L1+L2}{C}}$$

Junction 28 has a reference voltage less than the source voltage +V. The value of the reference voltage serves both to bias the diode 20 to conduction when switch X1 is conducting and limit the resulting current through the network Y1 to a value not greater than the current value in the selected drive line. The diode 20 is included to back bias the reference voltage when the transistor switch X1 is not conducting so that there is no conduction of current through drive line A1.

Zener diode 30 is connected in series with the junction 28 and source +V to establish a reference voltage at the junction 28. The diode 30 further serves to clamp the reference voltage to a constant value which in turn establishes a specific voltage potential between the emitter of transistor 12 and junction 18 toward which the ringing voltage is dampened. An ordinary diode operating with the capacitor 26 could serve the same functions as the Zener diode if poled in the opposite direction.

The capacitor 26 is connected in parallel with resistor 24 to provide a pass for the AC ringing current. Furthermore, the capacitor 26 blocks the DC current. The resistor 24 can be made large enough to limit any DC current.

In FIG. 4 an alternative means to provide a reference voltage at junction 28 is shown. With the absence of the diode 30, it would be necessary to connect resistor 24 to a voltage source $V'<V$. While the advantages of using a diode would be absent, a reference voltage could nevertheless be provided at junction 28.

A practical circuit according to the present invention may have circuit components of the following values. These are given merely by way of example and are not meant to be limiting.

| | | |
|---|---|---|
| +V | volts | 15 |
| L1 | nanohenries | 300 |
| L2 | do | 300 |
| C | picofarads | 350 |
| Resistor 22 | ohms | 20 |
| Resistor 24 | do | 30 |
| Capacitor 26 | microhenry | 0.2 |

Obviously, many modifications of the present invention are possible in the light of the above teaching. It is therefore to be understood that, in the scope of the appended claims, the invention may be practiced otherwise than as specifically described.

What is claimed is:

1. A memory drive system having a plurality of storage means in association with a plurality of conductive means, comprising:
a voltage source,
a first switching means for applying voltage from said voltage source to at least one of a plurality of conductive means,
a first impedance element and diode serially connected between said conductive means and a junction,
said junction having a reference voltage sufficient to bias said diode for conduction when said first switching means is conductive,
said reference voltage being provided by connecting to said junction a second impedance means in series with a second voltage source and a capacitive means in parallel with said second impedance means, and
second switching means in series with at least one of said conductive means operable to permit conduction through one of said conductive means.

2. A memory drive circuit comprising:
a voltage source,
a first switching means for applying the voltage of said source to a conductor means as a pulse,
a critical damping circuit coupled to and in parallel with said conductor means and energized only when said first switching means applies voltage to said conductor means, said critical damping circuit having a value which dampens the effect of the stray inductances between the voltage source and the first switching means and the first switching means and the conductor means and also dampens the effect of stray capacitances between the conductor means and memory elements,
said critical damping circuit including a diode and impedance serially connected between said conductor means and a junction having a reference voltage,
said value of said critical damping circuit being equal to $\frac{1}{2}\sqrt{L/C}$ where L and C refer to said stray inductances and said capacitance respectively,
a second voltage source for biasing said diode to conduction when said first switching means is conductive, said second voltage source also limiting the current through said critical damping circuit to a value not greater than the current value in the conductive line, said second voltage source being a Zener diode serially connected between said voltage source and said junction, and
second switching means in series with at least one of said conductive means and causing conduction through one of said conductive means.

3. A memory drive system, having a plurality of storage means in association with a plurality of conductive means, comprising:
a voltage source,
a first switching means for applying voltage from said voltage source to at least one of said plurality of conductive means,
an impedance element and a first diode serially connected between said conductive means and a junction,
a reference voltage provided to said junction by connecting a second diode between said junction and said voltage source, said reference voltage biasing said first diode to non-conduction when said first switching means is non-conductive also limiting the resulting current through said impedance element to a value not greater than the current value in the conductive line, and
second switching means in series with at least one of said conductive means operable to permit conduction through one of said conductive means.

4. A memory drive circuit, having a plurality of storage means in association with a plurality of conductive means, said circuit comprising:
a voltage source,
first switching means for applying voltage from said source to at least one of said plurality of conductive means,
a resistive element and diode coupled to said conductive means and conductive only when said first switching means applies voltage from said source,
means for producing a reference voltage, said reference voltage coupled to and biasing said resistive element to non-conduction when said first switching means is not applying a voltage from said source, and
second switching means in series with at least one of said plurality of conductive means and causing conduction from said source by means of said first switching means through one of said plurality of conductive means.

5. The combination defined in claim 4 wherein the resistance R of said resistive element is equal to $\frac{1}{2}\sqrt{L/C}$ where L is the sum of stray inductances between said voltage source and said conductive means and C is the capacitance between the selected conductive means and the corresponding storage means.

6. The combination defined in claim 5 wherein said reference voltage is provided by connecting a diode in series with said voltage source.

7. The combination defined in claim 5 wherein said reference voltage is provided by connecting a second resistive means in series with a second voltage source and a capacitive means in parallel with said second resistive means.

8. The combination defined in claim 4 wherein said storage means comprise a grid of parallel, plated wire memory elements.

References Cited

UNITED STATES PATENTS

| | | | |
|---|---|---|---|
| 3,568,170 | 3/1971 | Catalani, Jr. et al. | 340—174 TB |
| 3,568,173 | 3/1971 | Klinger | 340—174 TB |
| 3,343,147 | 9/1967 | Ashwell | 340—174 TB |
| 3,140,401 | 7/1964 | Feissel | 307—88 |
| 3,421,152 | 1/1969 | Mahoney | 340—174 TB |

OTHER REFERENCES

IBM Technical Disclosure Bulletin, "Memory Drive System" by Caricari, et al. vol. 9, No. 7, December 1966, pp. 928-929.

IBM Technical Disclosure Bulletin, "Low-Breakdown Voltage Memory Drive" by Moore, vol. 10, No. 11, April 1968, pp. 1732, 1733.

STANLEY M. URYNOWICZ, JR., Primary Examiner

U.S. Cl. X.R.

340—174 PW, 174 LA, 174 DC; 307—270